July 5, 1927.

F. E. EVANS 1,634,458

LUBRICATING APPARATUS

Filed April 9, 1925

2 Sheets-Sheet 1

INVENTOR
Fenton E. Evans
BY
ATTORNEY

July 5, 1927.

F. E. EVANS 1,634,458

LUBRICATING APPARATUS

Filed April 9, 1925

2 Sheets-Sheet 2

INVENTOR
Fenton E. Evans
BY
J. L. Rivers,
ATTORNEY

Patented July 5, 1927.

1,634,458

UNITED STATES PATENT OFFICE.

FENTON E. EVANS, OF REDMOND, WASHINGTON.

LUBRICATING APPARATUS.

Application filed April 9, 1925. Serial No. 21,870.

My invention has particular reference to improvements in lubricating apparatus of the type operable by compressed air; and its objects are, to provide a grease pump, in connection with a suitable reservoir for grease and an outlet whereby grease can be applied to motor vehicles as required in a more facile way than has heretofore been commonly employed; to afford a cylinder capable of carrying a charge of compressed air in sufficient quantity to actuate the pump, in a practical manner, through a compressed air motor; to provide simple but effective means for controlling the air and grease; and, to afford a lubricating apparatus that is portable, notwithstanding it carries its own power.

In the accompanying drawings—

Figure 1:
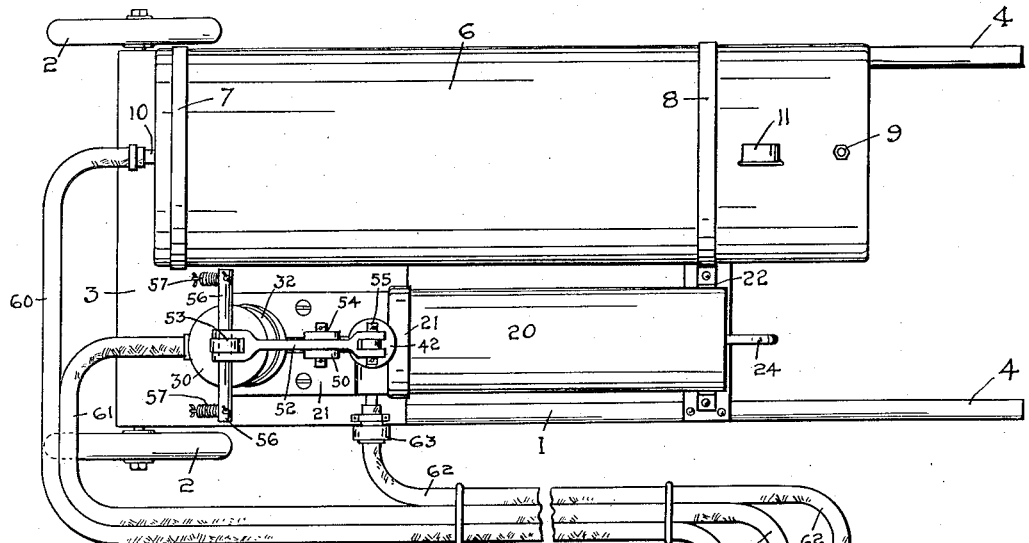
Figure 2:
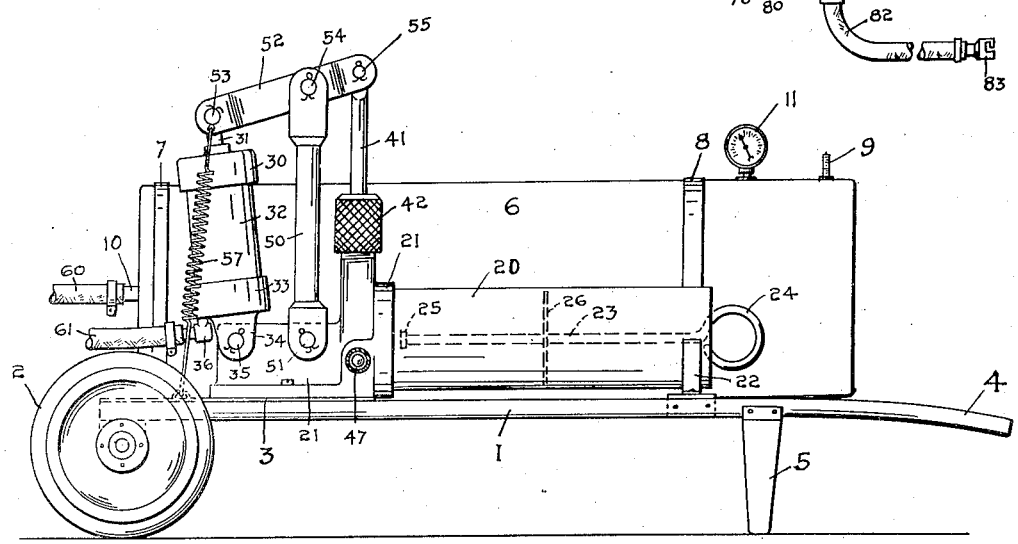
Figure 3:
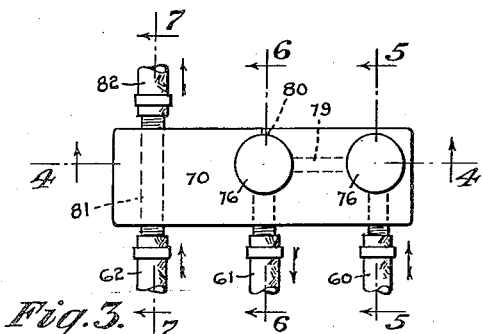
Figure 7:
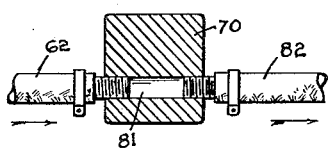
Figure 4:
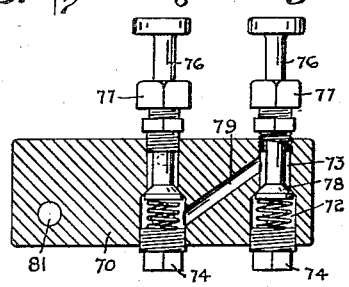
Figures 5, 6:
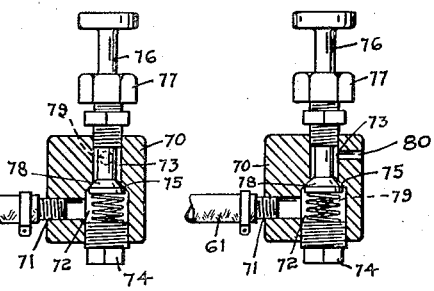
Figure 8:
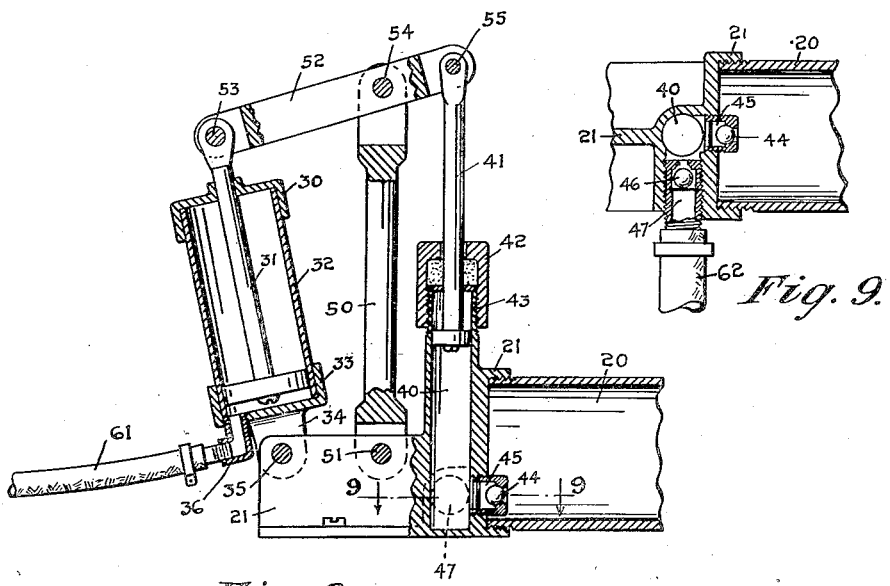

Figure 1 is a plan view of the entire device as connected up with a control member for air and grease, and indicating, in broken sections, the nozzle for applying grease;

Fig. 2, a side elevation of the device, the air tubes connecting up with the compressed air cylinder and the pump being broken away;

Fig. 3, a top plan view of said control member;

Fig. 4, a longitudinal section of the same, drawn on the line 4—4, of Fig. 3;

Fig. 5, a cross section of the same, drawn on the line 5—5, of Fig. 3;

Fig. 6, a cross section of the same, drawn on the line 6—6, of Fig. 3;

Fig. 7, a cross section of the same, drawn on the line 7—7, of Fig. 3;

Fig. 8, a vertical section particularly illustrating the compressed air motor, grease pump and connections therebetween, and a ball check valve disposed between the pump and the grease reservoir, said reservoir and the air connection for the motor being broken away;

And, Fig. 9, a cross section, drawn on the line 9—9, of Fig. 8, showing said valve, and another ball check valve operable between the grease outlet tube and the piston chamber of the pump.

Referring more particularly to the drawings, the frame 1, is provided at its front portion with a pair of wheels 2 and a platform 3, at its rear portion with a pair of handles 4, and a pair of oppositely disposed legs 5, which obviously are designed to provide mountings for the more essential parts of the device and permit it to be wheeled about.

A compressed air cylinder 6 is secured longitudinally of the frame by the bands 7 and 8, and it is provided with an inlet port 9, an outlet port 10, and an air pressure gauge 11. 20 designates a grease reservoir, which comprises a smaller cylindrical container 20, threadedly engaged at one end with the casting 21, and resting at the other end in a semicylindrical support 22. Under this construction the reservoir can be easily demounted, if desired, for cleaning. A rod 23, having at one end an annular handle 24, an enlarged portion 25 at the other end, and a follower 26 slidably mounted thereon, conformable in contour to the interior periphery of the reservoir, is disposed within the reservoir. The functions of said rod and parts just mentioned in connection therewith will be described hereinafter. The casting 21, secured to the platform 3, will likewise be described with more particularity.

The compressed air motor, in the present embodiment of the invention, comprises a cylinder consisting of a casting 30, which serves as a top portion and as a guide for the piston 31, a body 32, of standard tubing, in threaded engagement with the casting 30, and a casting 33, which constitutes the lower portion of the cylinder, and is also threadedly engaged with the body. Said casting 33 is provided with a pair of dependent spaced lugs 34 which straddle a longitudinally disposed web section of the casting 21, and afford a pivotal connection for the motor therewith, as indicated at 35. 36 denotes an air inlet port for the motor, threaded to the casting 33; the same being more particularly shown in Fig. 8.

The grease pump consists of a chamber 40, the lower portion of which communicates with the grease reservoir 20. It is an integral part of the casting 21, and machined out to accommodate a piston 41, which has, as a stuffing box, a casting 42 in threaded engagement with the body of the chamber, as indicated at 43, and which also serves as the top portion of said chamber. A ball check valve 44 controls the inlet port 45 for the grease from the reservoir into the chamber 40, and another ball check valve 46 controls the flow of the grease from the pump through its outlet port 47, as indicated in Fig. 9.

The motor and the pump are connected up by a rocking shaft 50 provided with slotted extremities which permit its lower end to straddle said web section of the casting 21, to be pivotally connected therewith, as indicated at 51, and to operatively support a rocking lever 52. Said rocking lever, also slotted at each end, is pivotally connected with the piston of the motor, the rocking shaft and the piston of the pump, as denoted by 53, 54 and 55 respectively. The pivot pin at the connection 53 is extended on either side to afford a support 56 for a pair of spiral springs 57, which extend therefrom and are secured to the platform 3; said springs serving to return the pistons of the motor and the pump to the positions shown in Fig. 2, after an upward stroke of the motor piston.

60 denotes a tube connected with the outlet port of the compressed air cylinder, 61 an air tube communicating with the compressed air motor, and 62 a high pressure flexible metal hose connected with the outlet port of the pump for conveying grease from the pump, and to facilitate its movement it is provided with a swivel joint 63.

Said tubes and hose are designed to be connected up with the control member, the body of which is designated as 70, and as indicated in Fig. 1. This member comprises, in the present embodiment of the invention, a structure having a body rectangular in cross section, and provided with a threaded opening 71 for engaging the threaded connection of the air tube 60, as detailed in Fig. 5. This opening communicates with portions adapted to house a valve, comprising a chamber 72, and an opening 73 for a valve spindle. 74 denotes a plug threadedly engaged with the valve chamber and serves as a closure for the bottom thereof, 75 a valve seat at the other end of said chamber, 76 a valve spindle, 77 a stuffing box, and 78 a spindle nut disposed between the valve spring and seat, and adapted to impart motion to the spindle through the spring.

79 denotes an air passage in the control member establishing communication between the valve just described and another valve located adjacent thereto. The air tube 61, extending from the compressed air motor, is connected up with the control member in the same way as that just indicated for the air tube 60, and as this second valve is identical in construction with the valve first named, the parts are given the same designations, as will be noted by referring to Fig. 6. An air port 80 is shown in Figs. 3 and 6, the same being utilized, as will further appear, for exhausting air out of the motor after an upstroke of its piston.

An opening 81, extending through the control member and threaded at either end, provides a passage for grease from the pump through said member. As indicated in Fig. 7, the hose 62 is connected up with one end of the opening, and a section of similar hose denoted by 82, and carrying a nozzle 83 by which the grease is applied, is secured to the other end of the opening.

In utilizing the device, assembled as shown and described, and obviously after the compressed air cylinder 6 and the grease tank 20 respectively have received charges of air and grease, the opening of the valve disposed at one end of the control member permits air from said cylinder to be forced from the tube 60 into the valve chamber and up into the opening 73—which, it will be noted, is somewhat larger in diameter than the valve spindle housed within it—and from thence through the passageway 79 into the chamber of the other valve, the tube 61 and into the motor. The compressed air, thus conveyed, produces an upward stroke of the motor piston 31, which, through the connections provided, imparts a downward thrust to the piston 41 of the pump. The automatic closing of the first-named valve, effected as is evident by release of its spindle, shuts off the supply of air from said cylinder, leaving a charge of air in the motor. The opening of the second-named valve in the control block, which is connected up with the tube 61 leading to the motor, allows the charge of air in the motor to escape through the air port 80, particularly shown in Figs. 6 and 7, then through the action of the spiral springs 57, the motor piston is brought downwardly to its limit and an upward thrust exerted on the piston of the pump, thereby filling the chamber of the pump with grease. The valve last referred to being also automatically closed, through release of its spindle, the device is now in condition for greasing operations. A repetition of the movements just described, which in short consist, as far as the operator is immediately concerned, in the opening of one valve, its automatic closing, and the opening of the other valve will force a charge of grease through the nozzle 83 for a greasing operation. As is evident, the automatic closing of the second valve will make the device ready for another and like operation.

I contemplate that the chamber of the pump will have a capacity which will, in connection with the instrumentalities communicating therewith, supply at each upward stroke of the motor piston a charge of grease such as is ordinarily required, but as it will be seen, any quantity necessary can be forced quickly through the device, as desired.

This lubricating apparatus, mounted on wheels and having convenient handles, is extremely handy in greasing vehicles which are not readily accessible to the usual source of compressed air, as it can be easily moved, and it is not necessary to handle long or heavy tubing connected with a remote supply of air. It eliminates the drudgery incident to the use of manually operated grease guns, and does more effective greasing than can be accomplished thereby—especially noticeable where large trucks, or the like, are involved.

Changes in and modifications of the construction described may be made without departing from the spirit of my invention or sacrificing its advantages, hence I ask that I be not confined to the specific structure set forth.

I claim:

1. A device of the class described, comprising a frame, a compressed air motor having a piston, a compressed air cylinder, a grease pump, a rocking shaft, a rocking lever mounted on the shaft and operatively connecting the motor with the pump, a spring control for the piston disposed between the lever and the frame, a grease reservoir, a valve control member for compressed air, and, operable through said member, means for establishing communication for compressed air from the cylinder to the motor, means for discharging air from the motor, and means for discharging grease from the pump.

2. In a grease gun, a compressed air supply, a grease supply, a pump operable to withdraw a charge of grease from the supply and then discharge the same, a motor for actuating the pump, a flexible conduit leading from the compressed air supply, and a flexible conduit leading from the motor, a head connecting said conduits, and independently operable valves carried by the head, one of which controls communication between said conduits through the head and the other communication of the motor through said head with the atmosphere.

3. In a lubricating apparatus, the combination of a tubular member for carrying a grease supply, a head closing one end of said member, a pump having a portion thereof formed by said head and being in valve-controlled communication with the interior of the member; a cylinder and piston also mounted on said head in lateral spacement from the pump, and operative connections between the piston and pump.

4. In a lubricating apparatus, the combination of a tubular member for carrying a grease supply, a head closing one end of said member, a pump having a portion thereof formed by said head and being in valve-controlled communication with the interior of the member; a cylinder and piston also mounted on said head in lateral spacement from the pump, a standard supported by the head between the cylinder and pump, and a rocker arm pivotally carried by the standard and having its ends pivoted respectively to the piston and pump.

5. In a lubricating apparatus, the combination of a tubular member for carrying a grease supply, a head closing one end of said member, a pump having a portion thereof formed by said head and being in valve-controlled communication with the interior of the member; a cylinder and piston also mounted on said head in lateral spacement from the pump, a standard pivotally supported by the head between the cylinder and pump, and a rocker arm pivotally carried by the standard and having its ends pivoted respectively to the piston and pump.

FENTON E. EVANS.